United States Patent
Zheng et al.

(10) Patent No.: US 11,475,316 B2
(45) Date of Patent: Oct. 18, 2022

(54) INTELLIGENT DRILLING RIG CONTROL SYSTEM COMMISSIONING, DIAGNOSTICS AND MAINTENANCE

(71) Applicant: Schlumberger Technology Corporation, Sugar Land, TX (US)

(72) Inventors: Shunfeng Zheng, Katy, TX (US); Marcos Kajita, Houston, TX (US); Zhijie Liu, Katy, TX (US); Eric Thiessen, Katy, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 716 days.

(21) Appl. No.: 16/382,749

(22) Filed: Apr. 12, 2019

(65) Prior Publication Data

US 2020/0327423 A1    Oct. 15, 2020

(51) Int. Cl.
*G06N 5/02* (2006.01)
*E21B 44/00* (2006.01)

(52) U.S. Cl.
CPC ............... *G06N 5/02* (2013.01); *E21B 44/00* (2013.01)

(58) Field of Classification Search
CPC . G06F 9/5077; G06F 9/4843; G06Q 10/1097; G06Q 10/0631; G06N 20/00; G06N 5/022; G06N 5/02; G06N 7/005; E21B 44/00; E21B 21/08; E21B 41/0092; E21B 41/00
See application file for complete search history.

(56) References Cited

U.S. PATENT DOCUMENTS

| | | |
|---|---|---|
| 10,353,358 B2 | 7/2019 | Tunc et al. |
| 2004/0153245 A1 | 8/2004 | Womer et al. |
| 2008/0173480 A1 | 7/2008 | Annaiyappa et al. |
| 2010/0050017 A1 | 2/2010 | Almadi et al. |
| 2010/0114493 A1 | 5/2010 | Vestal |
| 2010/0147589 A1 | 6/2010 | Wingky |
| 2013/0231781 A1 | 9/2013 | Chapman |
| 2014/0340990 A1 | 11/2014 | Chen et al. |
| 2015/0053483 A1 | 2/2015 | Eugene |
| 2016/0041803 A1 | 2/2016 | Markov et al. |
| 2020/0277847 A1* | 9/2020 | Rojas ............ G06Q 10/20 |

FOREIGN PATENT DOCUMENTS

| | | |
|---|---|---|
| CN | 201460863 U | 5/2010 |
| GB | 2156516 A | 10/1985 |
| WO | 2014151453 A1 | 9/2014 |
| WO | WO-2019051439 A1 * | 3/2019 ............ E21B 44/00 |

* cited by examiner

*Primary Examiner* — Jaehwan Oh

(57) ABSTRACT

A method for commissioning a drilling rig. The method includes detecting a first plurality of components of a drilling rig control system to control a drilling operation, obtaining a knowledge graph comprising a plurality of nodes corresponding to the first plurality of components, and a plurality of links connecting the plurality of nodes, wherein each of the plurality of links represents at least a target measure of data communication and resource utilization of each pair of components of the first plurality of components, and performing, by a drilling rig commissioning system and based on the knowledge graph, a management task of the drilling rig control system.

29 Claims, 11 Drawing Sheets

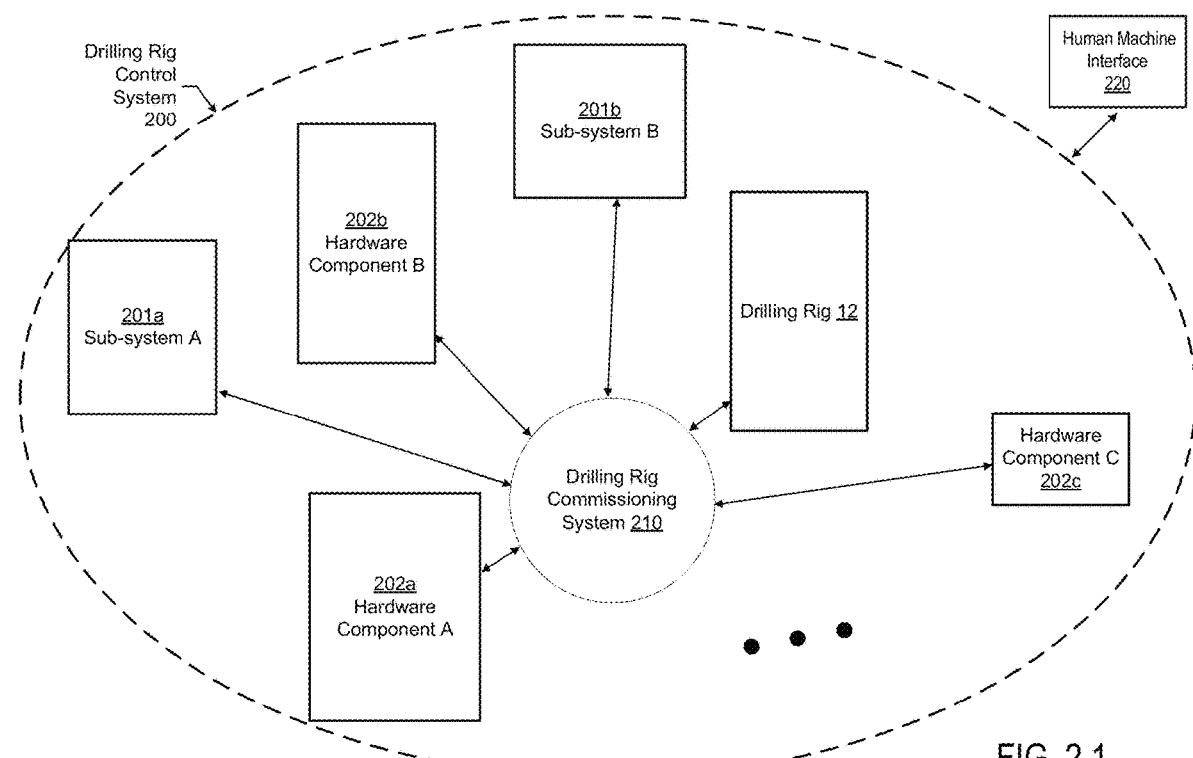
FIG. 2.1

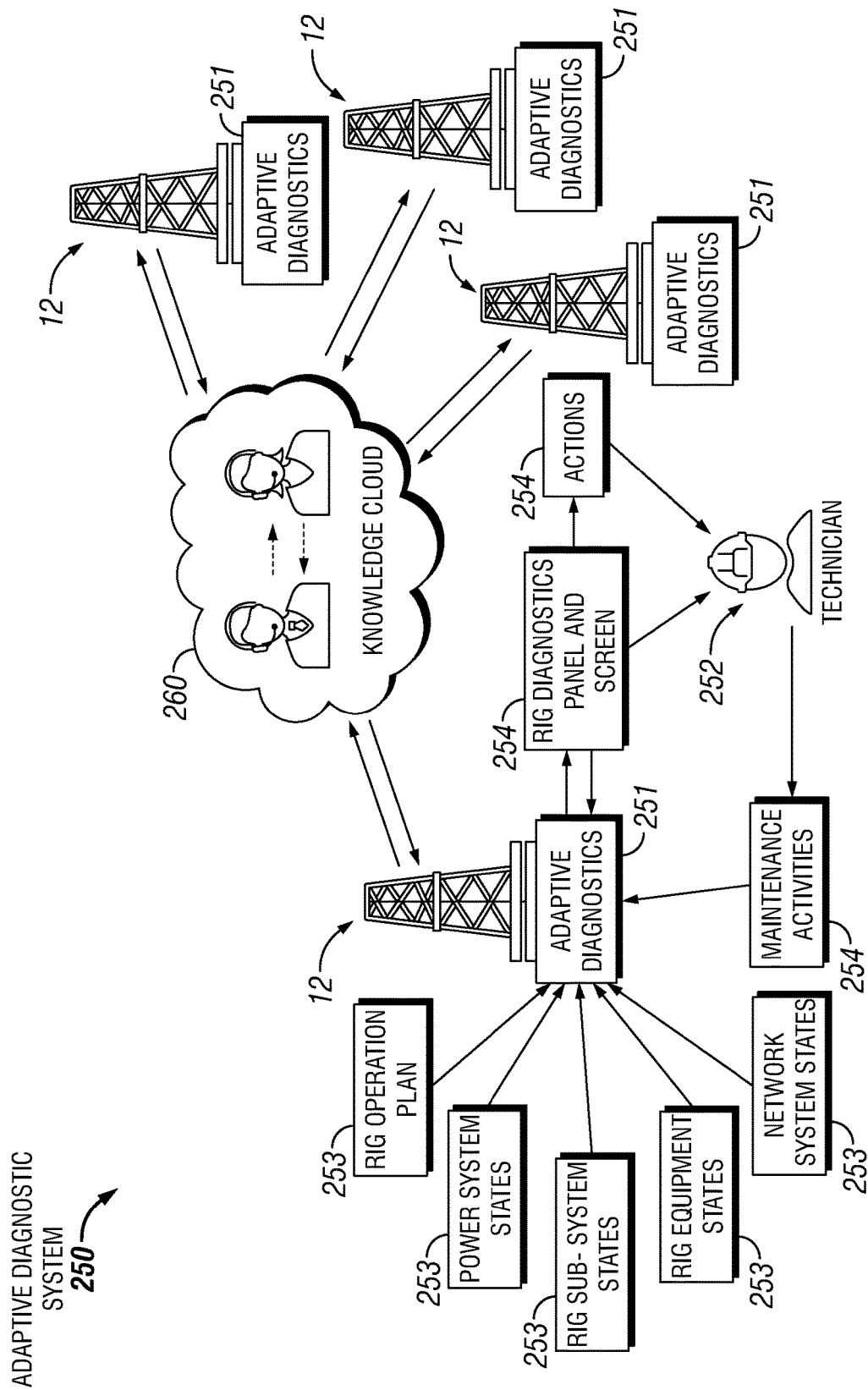
FIG. 2.2

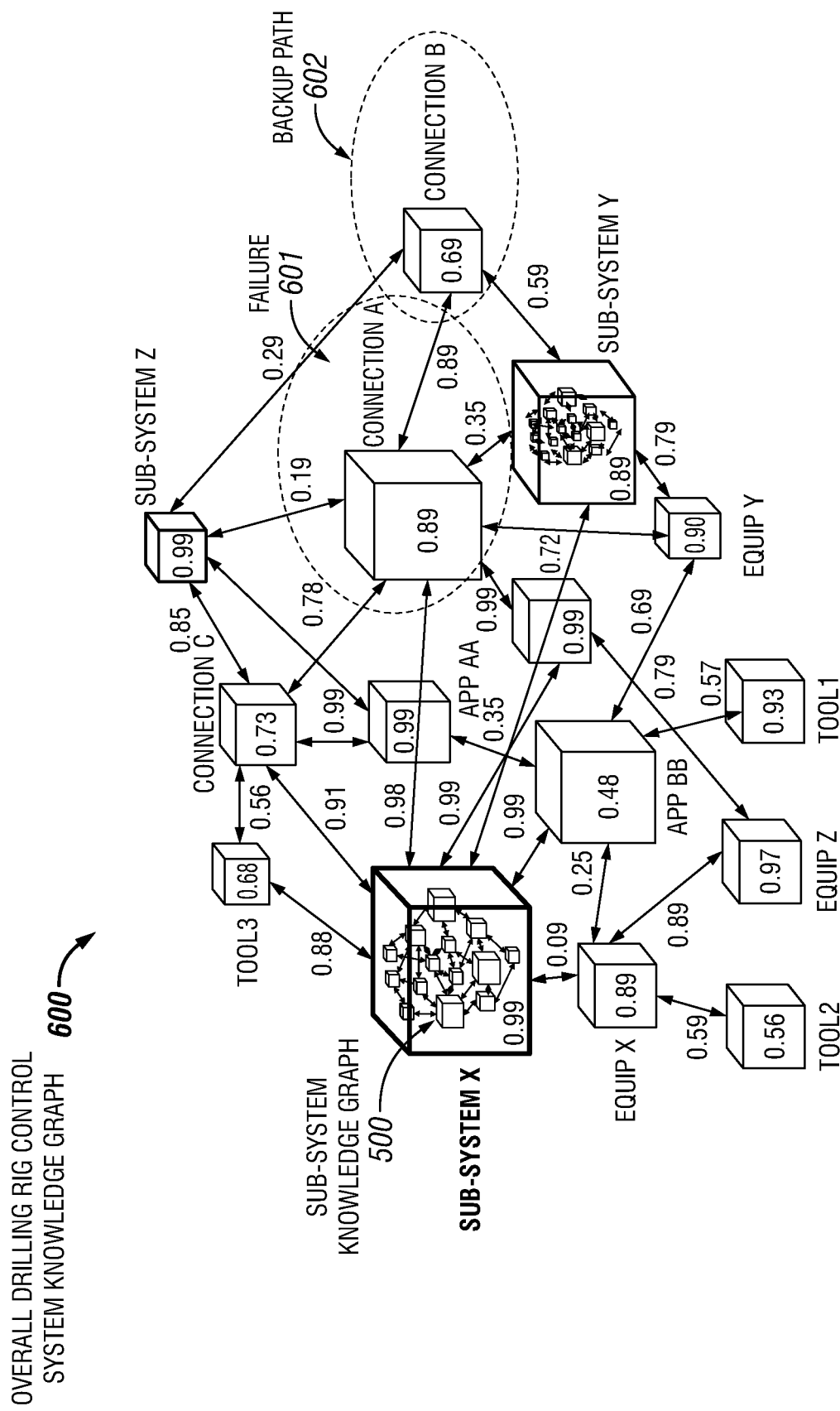
FIG. 6.1

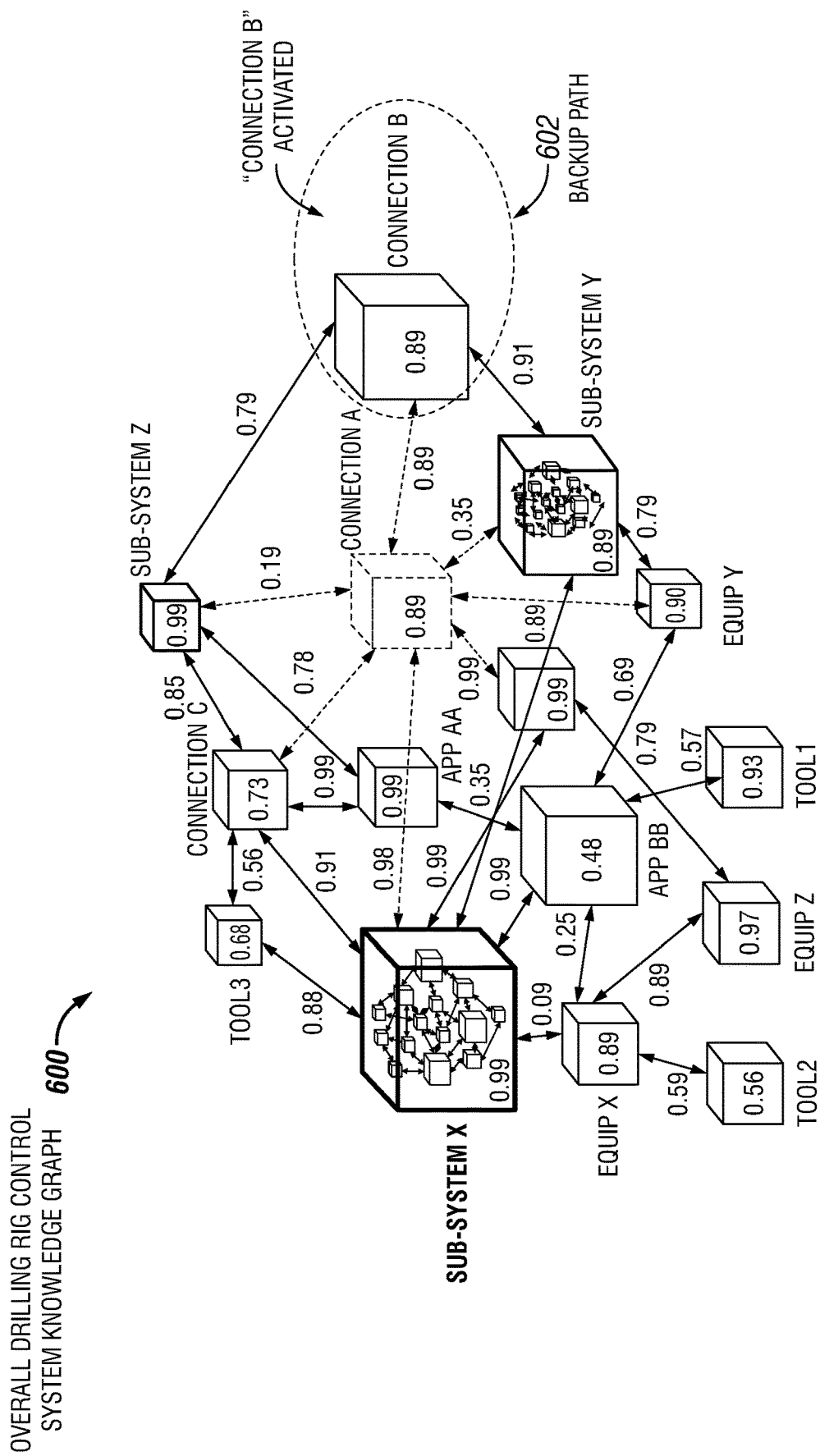
FIG. 6.2

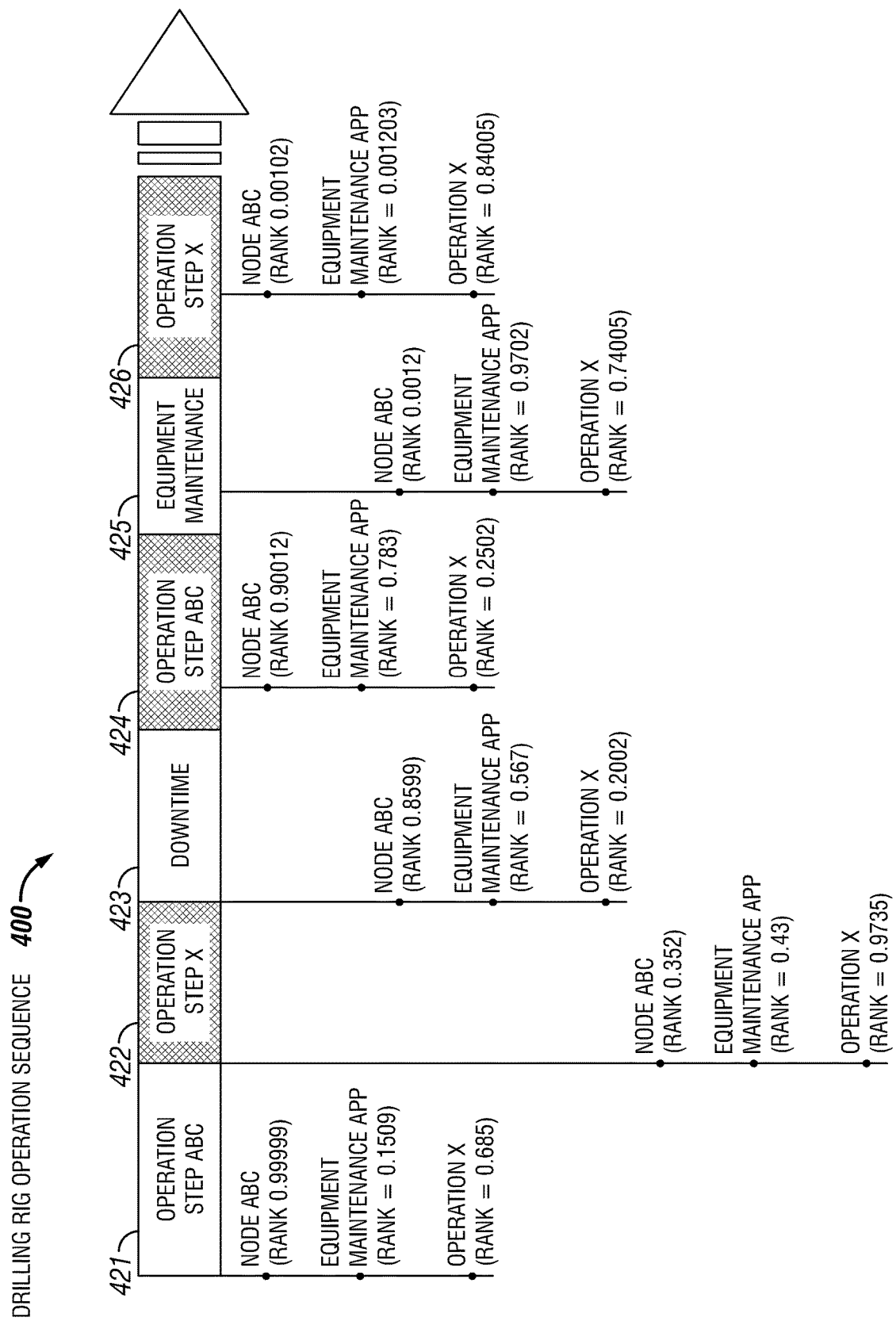
FIG. 7.1

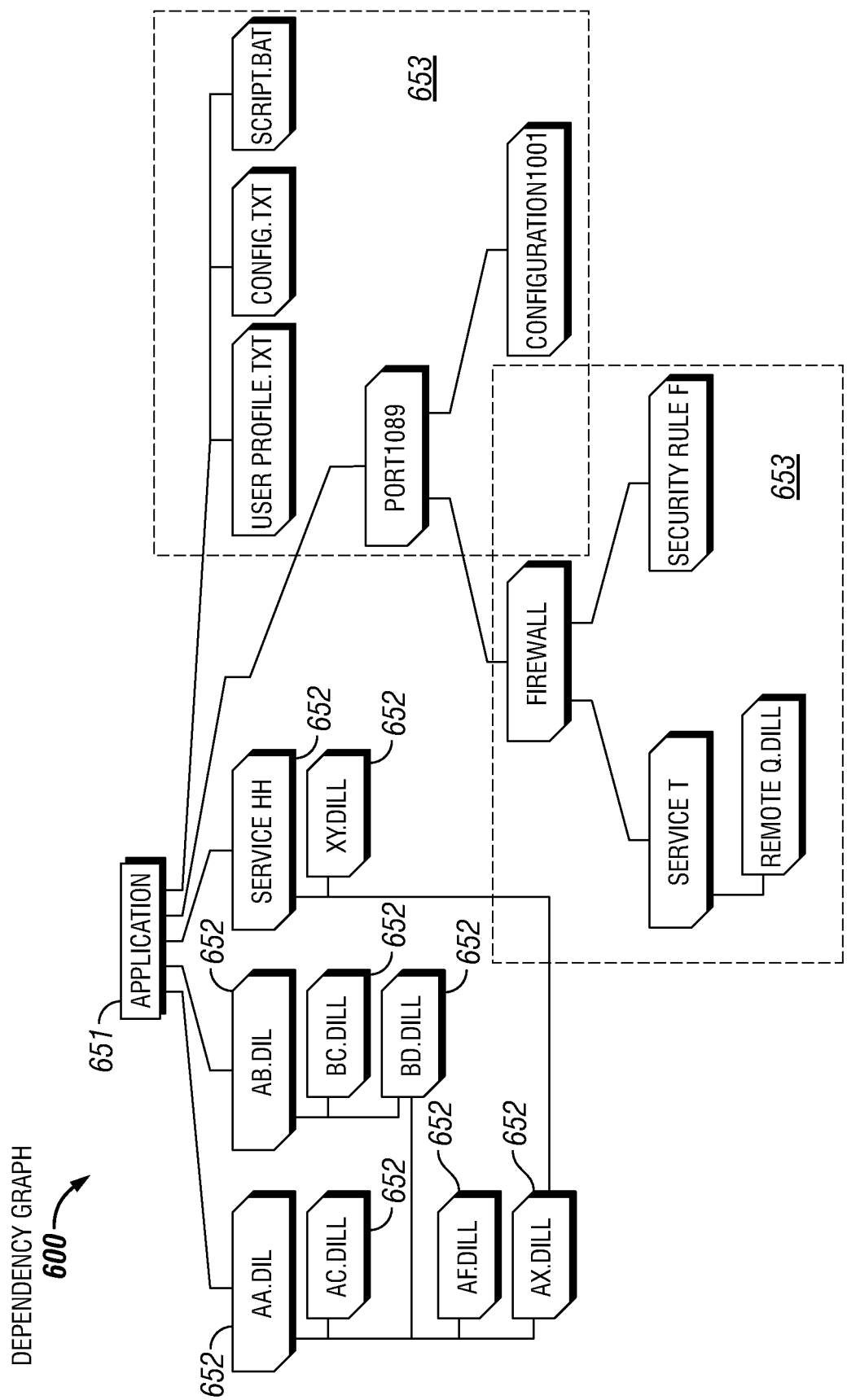
FIG. 7.2

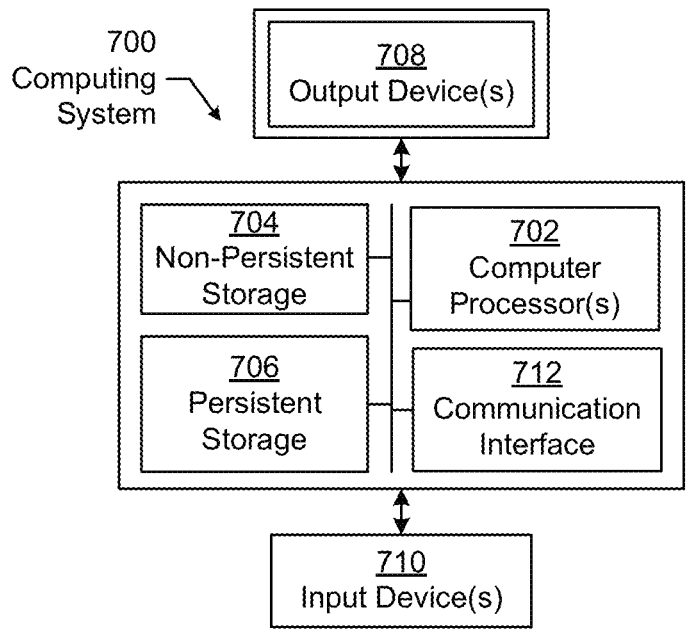
FIG. 8.1
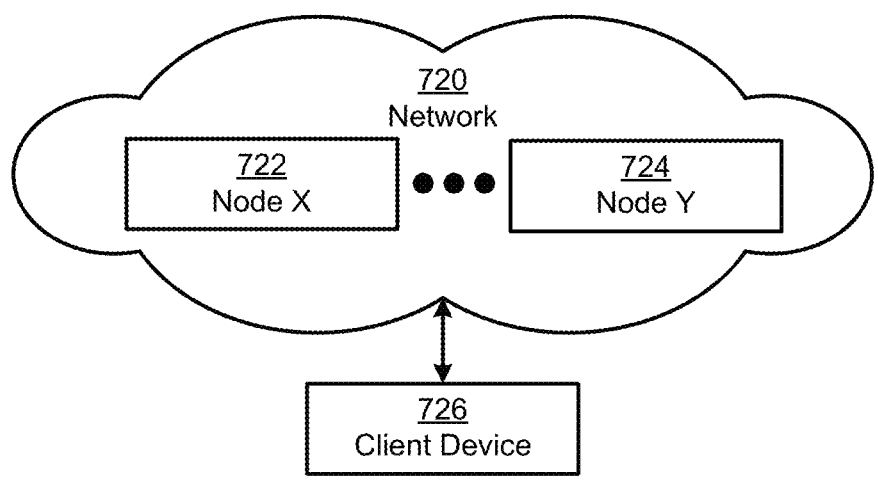
FIG. 8.2

INTELLIGENT DRILLING RIG CONTROL SYSTEM COMMISSIONING, DIAGNOSTICS AND MAINTENANCE

BACKGROUND

Various components of a drilling rig control system may be disposed throughout a drilling rig in order to control various operations on the drilling rig. These components may control drilling equipment, monitor the performance of the drilling rig, and/or perform various diagnostic and maintenance operations with respect to the drilling rig.

SUMMARY

In general, in one aspect, the invention relates to a method. The method includes detecting a first plurality of components of a drilling rig control system to control a drilling operation, obtaining a knowledge graph comprising a plurality of nodes corresponding to the first plurality of components, and a plurality of links connecting the plurality of nodes, wherein each of the plurality of links represents at least a target measure of data communication and resource utilization of each pair of components of the first plurality of components, and performing, by a drilling rig commissioning system and based on the knowledge graph, a management task of the drilling rig control system.

In general, in one aspect, the invention relates to a drilling rig commissioning system. The drilling rig commissioning system includes a computer processor, memory storing instructions, when executed by the computer processor, comprising functionality of detecting a first plurality of components of a drilling rig control system to control a drilling operation, obtaining a knowledge graph comprising a plurality of nodes corresponding to the first plurality of components, and a plurality of links connecting the plurality of nodes, wherein each of the plurality of links represents at least a target measure of data communication and resource utilization of each pair of components of the first plurality of components, and performing, based on the knowledge graph, a management task of the drilling rig control system, and a data repository for storing the knowledge graph.

In general, in one aspect, the invention relates to a non-transitory computer readable medium storing instructions. The instructions when executed comprising functionality for detecting a first plurality of components of a drilling rig control system to control a drilling operation, obtaining a knowledge graph comprising a plurality of nodes corresponding to the first plurality of components, and a plurality of links connecting the plurality of nodes, wherein each of the plurality of links represents at least a target measure of data communication and resource utilization of each pair of components of the first plurality of components, and performing, based on the knowledge graph, a management task of the drilling rig control system.

In general, in one aspect, the invention relates to a method. The method includes detecting a plurality of components of a drilling rig control system to control a drilling operation, obtaining, during a machine learning training phase of the drilling operation at the wellsite and from the plurality of components, a pre-determined measure of data communication and resource utilization of each pair of components of the plurality of components, generating, using a machine learning algorithm, a knowledge graph comprising a plurality of nodes corresponding to the plurality of components, and a plurality of links connecting the plurality of nodes, wherein each of the plurality of links represents the pre-determined measure of data communication between a corresponding pair of components, and providing the knowledge graph to a drilling rig commissioning system for performing a management task of the drilling rig control system.

In general, in one aspect, the invention relates to a method. The method includes detecting a plurality of components of a drilling rig control system to control a drilling operation, obtaining, during a machine learning training phase of the drilling operation at the wellsite and from the plurality of components, a pre-determined measure of data communication and resource utilization of each pair of components of the plurality of components, generating, using a machine learning algorithm, a knowledge graph comprising a plurality of nodes corresponding to the plurality of components, and a plurality of links connecting the plurality of nodes, wherein each of the plurality of links represents the pre-determined measure of data communication between a corresponding pair of components, and providing the knowledge graph to an adaptive diagnostics system for performing a diagnostic task of the drilling rig control system.

In general, in one aspect, the invention relates to a method. The method includes detecting a first plurality of components of a drilling rig control system to control a drilling operation, obtaining a knowledge graph comprising a plurality of nodes corresponding to the first plurality of components, and a plurality of links connecting the plurality of nodes, wherein each of the plurality of links represents at least a target measure of data communication and resource utilization of each pair of components of the first plurality of components, obtaining, during the drilling operation at the first wellsite and from the plurality of components, a health measure of the plurality of components, comparing, based on the knowledge graph, the obtained health measure and a corresponding target measure of the plurality of components to generate a result, and performing, at the first wellsite, a diagnostic task of the drilling rig control system based on the result.

Other aspects of the disclosure will be apparent from the following description and the appended claims.

BRIEF DESCRIPTION OF DRAWINGS

FIGS. 1, 2.1, and 2.2 show systems in accordance with one or more embodiments.

FIGS. 5, 6.1, 6.2, 7.1, and 7.2 show an example in accordance with one or more embodiments.

FIGS. 8.1 and 8.2 show a computing system in accordance with one or more embodiments.

DETAILED DESCRIPTION

Figure 1:
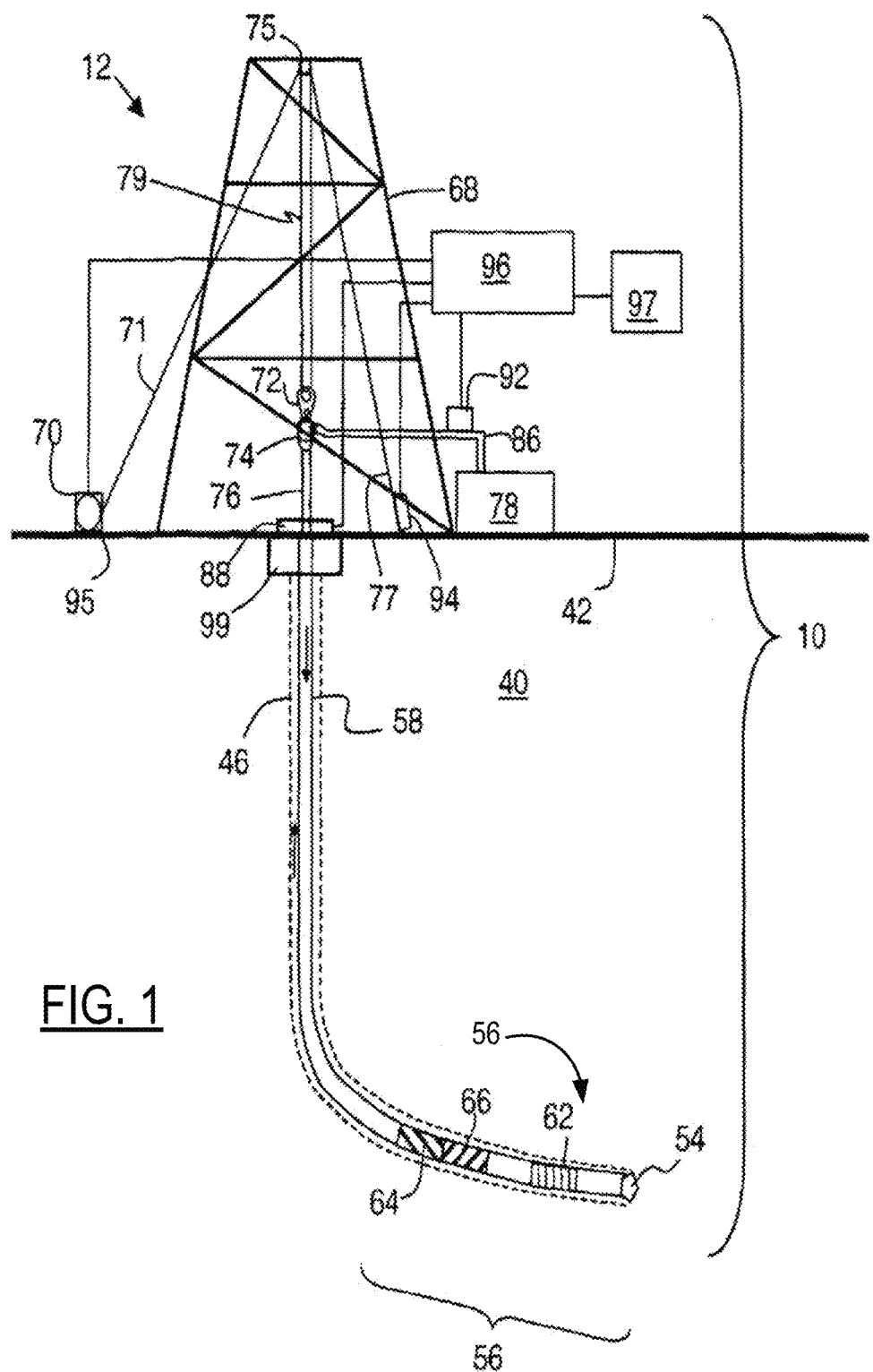

Specific embodiments of the disclosure will now be described in detail with reference to the accompanying figures. Like elements in the various figures are denoted by like reference numerals for consistency.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the disclosure include a system and various methods for generating and/or using a knowledge graph of a drilling rig control system. In one or more embodiments, the knowledge graph includes nodes corresponding to components of the drilling rig control system and links connecting the nodes to represent interactions between corresponding pairs of components. In one or more embodiments, each link represents at least a target measure of data communication and resource utilization of the corresponding pair of components.

In one or more embodiments, the drilling rig control system is hierarchical and include a first hierarchy and a second hierarchy. The first hierarchy includes sub-systems and hardware components (e.g., drilling equipment and supporting tools) while the second hierarchy includes software components installed on each of the sub-systems. In one or more embodiments, each sub-system, with installed software components, is associated with an aspect of the drilling operation, and is used to control a portion of the hardware components dedicated to the particular aspect of the drilling operation.

In one or more embodiments, the knowledge graph includes a overall drilling rig control system knowledge graph and a number of sub-system knowledge graphs. The overall drilling rig control system knowledge graph corresponds to the first hierarchy, and the sub-system knowledge graphs correspond to the second hierarchy. In one or more embodiments, the knowledge graph is generated by applying machine learning algorithms to the drilling rig control system during a normal drilling operation. In one or more embodiments, the knowledge graph is used as a standard for performing management tasks of the drilling rig control system. In one or more embodiments, the knowledge graph is used to aid in rig commissioning, in particular in the commissioning of the drilling rig control system. As used herein, the term "commissioning" refers to bringing the drilling rig to a working order, which may be performed any time prior to or during rig operation, and may be performed once or periodically throughout the drilling rig operation. In one or more embodiments, the knowledge graph is used to aid in diagnostics and maintenance of the drilling rig control system once the drilling rig control system is used in drilling rig operations.

FIG. 1 shows a block diagram of a system in accordance with one or more embodiments. In one or more embodiments of the disclosure, one or more of the elements shown in FIG. 1 may be omitted, repeated, and/or substituted. Accordingly, embodiments of the disclosure should not be considered limited to the specific arrangements of modules shown in FIG. 1.

As shown in FIG. 1, a drilling system (10) includes a drill string (58) within borehole (46). Borehole (46) may be located in the earth (40) having a surface (42). Borehole (46) is shown being cut by the action of drill bit (54). Drill bit (54) may be disposed at the far end of the bottom hole assembly (56) that is attached to and forms the lower portion of drill string (58). Bottom hole assembly (56) may include a number of devices including various subassemblies. Measurement-while-drilling (MWD) subassemblies may be included in subassemblies (62). Examples of MWD measurements may include direction, inclination, survey data, downhole pressure (inside the drill pipe, and/or outside and/or annular pressure), resistivity, density, and porosity. Subassemblies (62) may also include a subassembly for measuring torque and weight on the drill bit (54). The signals from the subassemblies (62) may be processed in a processor (66). After processing, the information from processor (66) may be communicated to pulser assembly (64). Pulser assembly (64) may convert the information from the processor (66) into pressure pulses in the drilling fluid. The pressure pulses may be generated in a particular pattern which represents the data from the subassemblies (62). The pressure pulses may travel upwards though the drilling fluid in the central opening in the drill string and towards the surface system. The subassemblies in the bottom hole assembly (56) may further include a turbine or motor for providing power for rotating and steering drill bit (54).

The drilling rig (12) may include a derrick (68) and hoisting system, a rotating system, and/or a mud circulation system, for example. The hoisting system may suspend the drill string (58) and may include draw works (70), fast line (71), crown block (75), drilling line (79), traveling block and hook (72), swivel (74), and/or deadline (77). The rotating system may include a kelly (76), a rotary table (88), and/or engines (not shown). The rotating system may impart a rotational force on the drill string (58). Likewise, the embodiments shown in FIG. 1 may be applicable to top drive drilling arrangements as well. Although the drilling system (10) is shown being on land, those of skill in the art will recognize that the described embodiments are equally applicable to marine environments as well.

The mud circulation system may pump drilling fluid down an opening in the drill string. The drilling fluid may be called mud, which may be a mixture of water and/or diesel fuel, special clays, and/or other chemicals. The mud may be stored in mud pit (78). The mud may be drawn into mud pumps (not shown), which may pump the mud though stand pipe (86) and into the kelly (76) through swivel (74), which may include a rotating seal. Likewise, the described technologies may also be applicable to underbalanced drilling. If underbalanced drilling is used, at some point prior to entering the drill string, gas may be introduced into the mud using an injection system (not shown).

The mud may pass through drill string (58) and through drill bit (54). As the teeth of the drill bit (54) grind and gouge the earth formation into cuttings, the mud may be ejected out of openings or nozzles in the drill bit (54). These jets of mud may lift the cuttings off the bottom of the hole and away from the drill bit (54), and up towards the surface in the annular space between drill string (58) and the wall of borehole (46).

At the surface, the mud and cuttings may leave the well through a side outlet in blowout preventer (99) and through mud return line (not shown). Blowout preventer (99) comprises a pressure control device and a rotary seal. The mud return line may feed the mud into one or more separator (not shown) which may separate the mud from the cuttings. From the separator, the mud may be returned to mud pit (78) for storage and re-use.

Various sensors may be placed on the drilling rig (12) to take measurements of the drilling equipment. In particular, a hookload may be measured by hookload sensor (94)

mounted on deadline (77), block position and the related block velocity may be measured by a block sensor (95) which may be part of the draw works (70). Surface torque may be measured by a sensor on the rotary table (88). Standpipe pressure may be measured by pressure sensor (92), located on standpipe (86). Signals from these measurements may be communicated to a surface processor (96) or other network elements (not shown) disposed around the drilling rig (12). In addition, mud pulses traveling up the drillstring may be detected by pressure sensor (92). For example, pressure sensor (92) may include a transducer that converts the mud pressure into electronic signals. The pressure sensor (92) may be connected to surface processor (96) that converts the signal from the pressure signal into digital form, stores and demodulates the digital signal into useable MWD data. According to various embodiments described above, surface processor (96) may be programmed to automatically detect one or more rig states based on the various input channels described. Processor (96) may be programmed, for example, to carry out an automated event detection as described above. Processor (96) may transmit a particular rig state and/or event detection information to user interface system (97) which may be designed to warn various drilling personnel of events occurring on the rig and/or suggest activity to the drilling personnel to avoid specific events.

In one or more embodiments, the drilling system (10) is located at a wellsite where a well is being drilled or to be drilled. For example, the borehole (46) may correspond to a well that has been drilled and completed. In such example, the wellsite is referred to as an established wellsite. In another example, the borehole (46) may correspond to a well that is being drilled prior to be completed. In yet another example, drilling system (10) is present at a remote location prior to starting drilling operation. In other words, the drilling system (10) includes only the rig without any borehole which may include, for example, a rig site or rig yard used in rig commissioning or testing. Thus, it is contemplated that the knowledge graph may be generated at any site including but not limited to a wellsite.

FIG. 2.1 shows a block diagram of a system in accordance with one or more embodiments. In one or more embodiments of the disclosure, one or more of the elements shown in FIG. 2.1 may be omitted, repeated, and/or substituted. Accordingly, embodiments of the disclosure should not be considered limited to the specific arrangements of modules shown in FIG. 2.1.

As shown in FIG. 2.1, a drilling rig control system (200) is coupled to a human machine interface (HMI) (220) that allows a user to control the operation of the drilling system described in reference to FIG. 1 above. A human machine interface may be hardware and/or software coupled to the drilling rig control system (200), and which includes functionality for presenting data and/or receiving inputs from a user regarding various drilling operations and/or maintenance operations performed within the drilling rig control system (200). For example, a human machine interface may include software to provide a graphical user interface (GUI) for presenting data and/or receiving control commands for operating a drilling rig.

In one or more embodiments, the drilling rig control system (200) includes a number of sub-systems (e.g., sub-system A (201*a*), sub-system B (201*b*)) and hardware components (e.g., hardware component A (202*a*), hardware component B (202*b*), hardware component C (202*c*)). The hardware components may include drilling equipment and other tools associated with a drilling rig (12), as described in reference to FIG. 1 above. For example, the hardware component A (202*a*) may correspond to a mud sub-system, the hardware component B (202*b*) may correspond to a rotating sub-system, and the hardware component C (202*c*) may correspond to a network element. A network element may include physical devices within a network, such as switches, routers, hubs or any other logical entities for establishing communication connections among the sub-systems and other hardware components. In one or more embodiments, the drilling rig control system (200) may include additional components, such as the adaptive diagnostics system (250) described in reference to FIG. 2.2 below.

The sub-systems (e.g., sub-system A (201*a*), sub-system B (201*b*)) may include, for example, programmable logic controllers (PLCs) having hardware and/or software with functionality to control one or more processes performed by a drilling rig (12), including, but not limited to the components described in FIG. 1. In particular, a PLC may be a ruggedized computer system with functionality to withstand vibrations, extreme temperatures, wet conditions, and/or dusty conditions, for example, around the drilling rig (12). Specifically, a PLC may control valve states, fluid levels, pipe pressures, warning alarms, and/or pressure releases throughout the drilling rig (12) and associated hardware component A (202*a*), hardware component B (202*b*), etc. As such, one or more components of the drilling rig control system (200) may include functionality to monitor and/or perform various drilling processes with respect to the mud circulation system, the rotating system, a pipe handling system, and/or various other drilling activities described in reference to FIG. 1 above. In one or more embodiments, the drilling rig control system (200) includes a hierarchical component structure. For example, the sub-systems (e.g., sub-system A (201*a*), sub-system B (201*b*)) and hardware components (e.g., hardware component A (202*a*), hardware component B (202*ba*), hardware component C (202*c*)) are collectively referred to as first hierarchy components forming a first hierarchy in the drilling rig control system (200). Within each first hierarchy component, the underlying hardware and/or software elements of each first hierarchy component are collectively referred to as second hierarchy components forming a second hierarchy in the drilling rig control system (200). For example, the first hierarchy components may include drilling equipment and supporting tools. Correspondingly, embedded software modules and/or hardware controllers within each drilling equipment or supporting tool form the second hierarchy components as described above.

In one or more embodiments, components of the drilling rig control system (200) are communicatively coupled to and managed by a drilling rig commissioning system (210), which is a computing system configured to perform one or more management tasks of the drilling rig control system (200). In one or more embodiments, the drilling rig commissioning system (210) enables an unified commissioning (or performing other management tasks) of all components in the drilling rig control system (200) via a single HMI (220). In other words, using the drilling rig commissioning system (210) alleviates the complexity in multiple separate commissioning of each component in the drilling rig control system (200) via multiple disintegrated HMIs.

In one or more embodiments, the management tasks include a software commissioning task, a network commissioning task, a diagnostic task, maintenance task, etc. In one or more embodiments, the drilling rig commissioning system (210) generates a knowledge graph that describes the normal operation of the drilling rig control system (200). The knowledge graph has a hierarchical structure corresponding to the hierarchical component structure of the drilling rig control system (200). In one or more embodiments, the drilling rig commissioning system (210) uses machine learning algorithms to generate the knowledge graph during normal operation of the drilling rig control system (200). The machine learning algorithms may be based on one or more of stochastic, numerical, and statistical analysis techniques. In one or more embodiments, the knowledge graph is used to perform diagnostic tasks during abnormal operation of the drilling rig control system (200). In one or more embodiments, the knowledge graph of the drilling rig control system (200) is used to perform software and network commissioning tasks to configure a new drilling rig control system separate from the drilling rig control system (200) on which the drilling rig commissioning system (210) is trained. For example, the new drilling rig control system commissioned by the drilling rig commissioning system (210) may be used to control a different drilling rig separate from the drilling rig (12) controlled by the drilling rig control system (200).

In one or more embodiments, the drilling rig commissioning system (210) performs various functionalities described above using the method described in reference to FIG. 3 below. An example of the knowledge graph is described in reference to FIGS. 5-6.2 below. In one or more embodiments, the drilling rig commissioning system (210), the human machine interface (220), and various components of the drilling rig control system (200) may be a computing system similar to the computing system (700) described in reference to FIGS. 8.1 and 8.2. In one or more embodiments, the drilling rig commissioning system (210) is separate from and in communication with the drilling rig control system (200). In one or more embodiments, the drilling rig commissioning system (210) and the drilling rig control system (200) are combined as an integrated system.

FIG. 2.2 shows a block diagram of a system in accordance with one or more embodiments. In one or more embodiments of the disclosure, one or more of the elements shown in FIG. 2.2 may be omitted, repeated, and/or substituted. Accordingly, embodiments of the disclosure should not be considered limited to the specific arrangements of modules shown in FIG. 2.2.

As shown in FIG. 2.2, an adaptive diagnostics system (250) automatically builds a system health baseline based on a knowledge graph described above. In particular, the adaptive diagnostics system (250) uses the system health baseline to monitor a health measure of the drilling rig control system (200) as operations progress. Based on the rig activities and monitoring of the state of drilling rig system components (253) (such as rig operation plan or state of power systems, rig sub-systems, rig equipment or network system), the adaptive diagnostics system (250) produces directives (254) for rig technicians to act upon to adjust the system towards the system health baseline. Thus, the system health interpretation to adjust the system to the system health baseline via directives (254) is performed by the adaptive diagnostics system (250) to reduce manual analysis by rig technicians (252). In one or more embodiments, the adaptive diagnostics system (250) is included in the drilling rig control system (200) depicted in FIG. 2.1 above.

As described in reference to FIG. 2.1 above, a knowledge graph is created and maintained by scanning and learning about every single aspect of the drilling rig control system (200) associated with a drilling rig (12). As mentioned above, such knowledge graph may be created at any time during rig commissioning, testing, drilling operations, or after drilling operations. When the system first starts, some level of configuration is required to provide the adaptive diagnostics system (250) a baseline for the drilling rig control system (200) that is being monitored. At this stage, an algorithm (denoted as adaptive diagnostics (251) of the adaptive diagnostics system (250)) learns all of the components that are available in the drilling rig control system (200) and determines what may be monitored. Once the basic learning step is complete, the adaptive diagnostics (251) takes over and continuously monitors the drilling rig control system (200) and automatically generates actions to the rig technician (252) or automatically contacts external systems such as the knowledge cloud (260) in search for solutions to any detected issues. The adaptive diagnostics (251) assigns scores and ranks to each of the components being monitored. As status on each component change, the adaptive diagnostics (251) updates scores and ranks, and generates actions.

The intelligence that drives the adaptive diagnostics (251) may be trained. Training happens throughout the development period of the drilling rig control system (200) and while the adaptive diagnostics (251) is in use on rigs where expert rig technicians (252) help maintain the drilling rig control system (200). While the drilling rig control system (200) is under development or being tested, the adaptive diagnostics (251) runs in the background in training (i.e., monitoring and learning) mode. During this step, the adaptive diagnostics (251) gathers information while engineers use the system and testers verify the system. As the adaptive diagnostics (251) learns how the system is used, the adaptive diagnostics (251) enhances its knowledge. When the adaptive diagnostics (251) is used at the rig (12), the adaptive diagnostics (251) remains in monitoring mode and performs real-time analysis/comparison between the decisions/actions taken by the expert rig technician (252) and decisions from internal decision algorithm of the adaptive diagnostics (251). If there is a deviation between the two decisions, the knowledge (i.e., information regarding the deviation) is captured to train the adaptive diagnostics (251). For example, the decisions from internal decision algorithm of the adaptive diagnostics (251) may be adjusted to match the decision (or path) taken by the expert technician (252). The knowledge (i.e., information regarding the deviation) collected during the training mode is stored locally and shared to the knowledge cloud (260) to be further evaluated by subject matter experts who help adjust the algorithm or correct actions taken by rig technicians (252).

The knowledge cloud (260) is a central database of all the knowledge acquired by each individual adaptive diagnostics (251). The knowledge cloud (260) provides insight to rig system experts who evaluate and make further recommendations to the decision-making process. The knowledge cloud (260) allows close monitoring of how each individual rig control system (200) of each drilling rig (12) is performing and provides the opportunity to further calibrate the corresponding adaptive diagnostics (251). With the knowledge cloud (260), sharing of the diagnostics information and decision making is done automatically. The need for expert rig technicians (252) is reduced because the system automatically adjusts to the knowledge and actions of expert rig technicians (252) and this knowledge is automatically shared through the adaptive diagnostics system (250) via the knowledge cloud (260).

The knowledge cloud (260) is also used to fine tune the adaptive algorithm's decision-making process. As each adaptive diagnostic (251) running on different rigs (12)

produces variables from the decision making process, the aggregate knowledge captured by the knowledge cloud (260) is used to adjust the decision-making process back to each rig (12).

Rig control systems (200) vary from one rig (12) to another because each rig (12) has different operational requirements. Thus, the equipment, the network topology, and the software used by the drilling rig control system (200) vary dramatically. For example, one of the rig sub-systems' computers may have hundreds of software applications or services running at any given time. Not all applications or services running on such computer are mission critical. Some of these applications are part of the Operating System (OS) and are indirectly part of mission critical applications. It is a daunting task to learn about every single application or service running on more than dozens of computers that make up the drilling rig control system (200). The adaptive diagnostics system (250) scans the entire drilling rig control system (200) and builds a knowledge graph of all applications, services, connections, use profiles, files rules, etc., and software tools running on each rig sub-systems (and each device thereof, as shown in the example of TABLE 1 below for an exemplary Computing Device X. In one or more embodiments, the adaptive diagnostics system (250) and the drilling rig commissioning system (210) collectively or cooperatively scan the entire drilling rig control system (200) and builds the knowledge graph. For example, the scanning may be performing during the commissioning learning period to generate the knowledge graph that is used by both the adaptive diagnostics system (250) and the drilling rig commissioning system (210). In one or more embodiments, the adaptive diagnostics system (250) and/or the drilling rig commissioning system (210) independently scan the entire drilling rig control system (200) and respectively build the knowledge graph.

TABLE 1

|  | CPU % | Mem. |
|---|---|---|
| Apps: | | |
| Application_J | 15.5% | 133.3 MB |
| Application_Z | 25.5% | 450.1 MB |
| Application_XW | 5.7% | 1033.3 MB |
| Application_D | 10.9% | 100.7 MB |
| Services: | | |
| Service_M | 0.9% | 5.7 MB |
| Service_BB | 1.9% | 32.7 MB |

| Files: | Size | Created | Checksum |
|---|---|---|---|
| C:\main\bin\appD.exe | 32.7 MB | Oct. 5, 2015 | A9032B |
| C:\tools\bin\srvBB.dll | 15.8 MB | Jan. 10, 2017 | FFEA00 |

| Ports: | Protocol | Host IP | Host Name |
|---|---|---|---|
| 10010 | UDP | 127.0.0.1 | localhost |
| 90080 | TCP | 192.168.0.10 | HostXYZ |

During this process, the adaptive diagnostics system (250) assigns importance scores and ranks to each of these software applications, connections, tools, equipment, etc., that are running or available. An example of the adaptive diagnostics system (250) assigning scores and ranks is described in reference to FIGS. 5-7 below. As part of its learning stage, the algorithm produces a graph having each item on the nodes and uses the edges between nodes to map the decision flow. Each node and edge have scores and ranks that are updated in real-time and is used by the algorithm to make decisions and produce actions for rig technicians (252).

Figure 3:
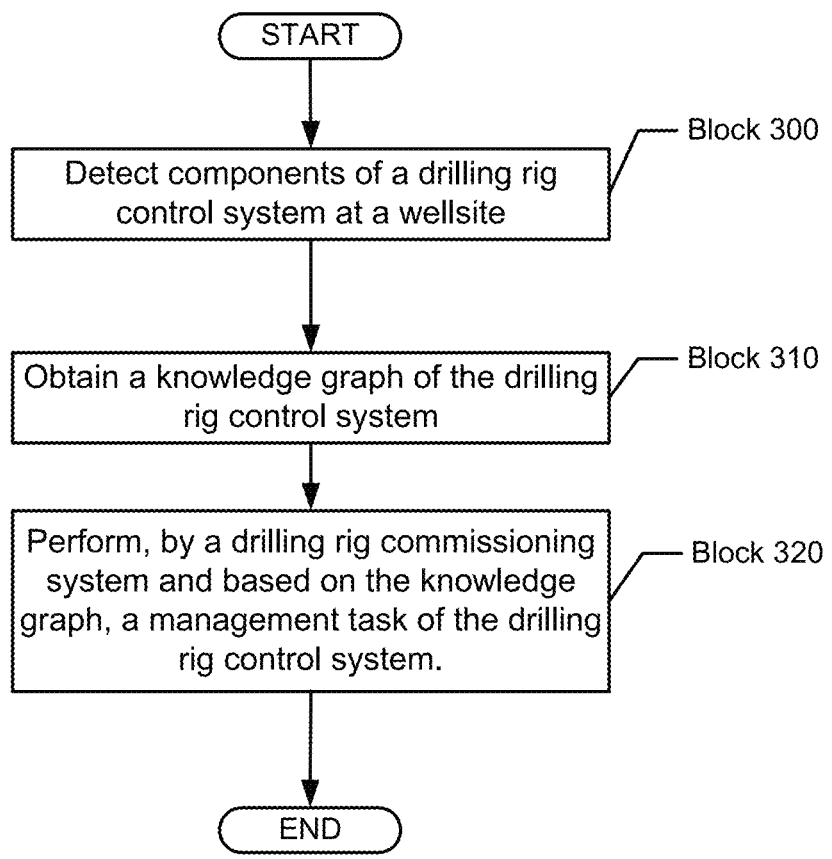
FIGS. 3 and 4 show flowcharts in accordance with one or more embodiments.

FIG. 3 shows a flowchart in accordance with one or more embodiments. In one or more embodiments, the method may be based on the systems depicted in FIGS. 1-2.2 above. One or more steps shown in FIG. 3 may be omitted, repeated, and/or performed in a different order among different embodiments of the invention. Accordingly, embodiments of the disclosure should not be considered limited to the specific number and arrangement of steps shown in FIG. 3.

In one or more embodiments, the flowchart depicted in FIG. 3 is used by a drilling rig commissioning system to commission or otherwise manage a drilling rig control system. Initially in Block 300, components of the drilling rig control system at a wellsite are detected. In one or more embodiments, the components are detected as individual sub-systems and hardware components are powered on and become online, i.e., start communicating via the network. The online components are to be commissioned and communicatively coupled to each other before being used to control a drilling operation at a newly developed wellsite.

In one or more embodiments, the components are detected in response to an alert during the drilling operation of an established wellsite. The alert may indicate abnormal operation or other event/incidence detected by the drilling rig control system or by a user monitoring the drilling operation. The alert may request, automatically or via the user qualifying the alert, the drilling rig commissioning system to perform a diagnostic of the drilling rig control system at the established wellsite.

In Block 310, a knowledge graph is obtained. Each of the components that make up the knowledge graph can be classified as a network component, computer hardware component, programmable device, software application, software services, software library, file on disc etc. In one or more embodiments, the knowledge graph is generated by the drilling rig commissioning system during a machine learning training period when a normal drilling operation is performed by the drilling rig control system. One or more of stochastic, numerical, and statistical analysis techniques may be used during the machine learning training period. In one or more embodiments, the knowledge graph is generated using the method described in reference to FIG. 4 below.

In one or more embodiments, statistical information stored in the nodes and links of the knowledge graph represents pre-determined target/reference measures of computing activities of corresponding sub-systems and/or data communication activities between each pair of components of the drilling rig control system. For example, the pre-determined measure may include an average, a median, a mode, a correlation, a ranking, a score, a category, and/or other statistics. In other words, the statistical information stored in the nodes and links of the knowledge graph may correspond to the average, median, mode, ranking, score, etc. of computing resource utilizations and/or communication activities of the corresponding pair of components. Further, the statistical information may also include the correlation between the computing resource utilizations and communication activities of the corresponding pair of components.

In one or more embodiments, the links also include ranking information, which is calculated based on various artificial intelligence (AI) depending on rig conditions, operational factors, operational stages, and overall system readiness. For example, the pre-determined measure represented by a particular link may be low, the particular link may have a rank higher than other links in the knowledge graph due to the operational need for the particular link. In one or more embodiments, the operational need for each node/link is determined based on one or more of rig conditions, operational factors, operational stages, and overall system readiness. An example of calculating ranking of nodes/links during drilling rig operation is described in reference to FIG. 7.1 below.

In one or more embodiments, the knowledge graph is obtained by the drilling rig commissioning system as a reference standard to diagnose potential issues (i.e. health monitoring) at an established wellsite or rig. For example, the knowledge graph may be obtained using machine learning from the established wellsite or rig during normal operation such that potential issues may be diagnosed in response to an alert indicating abnormal operating conditions. In one or more other embodiments, the knowledge graph obtained from the established wellsite or rig may be used as a target operating condition to commission a different wellsite or rig. For example, such different wellsite or rig may be under development prior to drilling operation or production. Further, it is also envisioned that the knowledge graph may be created at the rig site (whether or not it is co-located with a wellsite), particularly during rig commissioning and/or testing or even during a drilling operation.

In Block 320, a management task of the drilling rig control system is performed based on the knowledge graph by the drilling rig commissioning system. For example, the management task may include a software commissioning task, a diagnostic task, a maintenance task, etc. In one or more embodiments, a software commissioning task is performed based on the knowledge graph. For example, the software commissioning task may include one or more of software installation, software-to-service connection, software-to-software connection, license verification, user validation, and network port configuration. In one or more embodiments, the software commissioning task relates to software installed on sub-systems of the drilling rig control system at the newly developed wellsite or rig. For example, the software commissioning task may be performed with respect to the software component in the second hierarchy of the drilling rig control system.

In one or more embodiments, software installation includes one or more validation tasks of software version check, hardware type or model verification, hard disk capability verification, computer memory capacity check, operating system version check, firmware version check, firewall installation and configuration check, network bandwidth and throughput check, and other system parameter checks. In one or more embodiments, one of more of these validation tasks correspond to nodes on the knowledge graph that are connected, for example, via links to a software application. These links represent requirements for the software application to execute properly. If any of these nodes do not exist, the software application would not be able to execute properly. At this point the commissioning system may determine that the system does not meet the requirements and the software application can not be executed.

In one or more embodiments, a data communication connection between a pair of components of the drilling rig control system is established based on the knowledge graph. For example, the data communication connection may be established between a pair of components in the first hierarchy and/or second hierarchy of the drilling rig control system at the newly developed wellsite or rig.

In one or more embodiments, a diagnostic task of the drilling rig control system is performed based on the knowledge graph. In particular, during the current drilling operation at the established wellsite, a pre-determined measure of computing activities and/or data communication between a pair of components of the drilling rig control system is generated. For example, the pre-determined measure may correspond to data communication between a pair of components in the first hierarchy and/or second hierarchy of the drilling rig control system. The pre-determined measure is compared to a corresponding target pre-determined measure of the pair of components stored in the knowledge graph to generate a result. For example, the result may indicate a difference between the pre-determined measure obtained during the current drilling operation and the corresponding target pre-determined measure obtained during a prior normal drilling operation, such as during the machine learning training phase. In other words, the difference is a deviation of the current drilling operation from the prior normal drilling operation. For example, the deviation may be due to an out-of-date software component, an expiration of software license, an error of software configuration, etc. Accordingly, a diagnostic task is performed by analyzing the difference to identify a root cause of the deviation and to identify an applicable corrective action.

As mentioned above, each of the components of the drilling rig control system that make up the knowledge graph can be classified as a network component, computer hardware component, programmable device, software application, software services, software library, file on disk, etc. In one or more embodiments, the knowledge graph further includes health measures of each of the components of the drilling rig control system. For example, the health measure of a file on disk could be determined by its size on disk, accessibility, checksum of its content (if file is read-only), date of creation, file location, etc. The attributes that determines the health of a component can vary and they also impact the computation of scores and rankings.

In particular, a health is obtained during a normal drilling operation at a wellsite. During a machine learning training phase, an adaptive diagnostic algorithm may be used to monitor an expert user input that is used for diagnostics and maintenance of the wellsite. Accordingly, the health measure and the expert user input are compared during the machine learning training phase to generate a correlation result. Subsequent to the machine learning phase, the correlation result is provided to the adaptive diagnostics system to facilitate performing a diagnostic task of the drilling rig control system. In one or more embodiments, the correlation result is stored in the knowledge graph, where the correlation result is provided via the knowledge graph to the adaptive diagnostics system. In one or more embodiments, the correlation result is stored in a knowledge cloud accessible by multiple wellsites, wherein the correlation result is provided via the knowledge cloud to the adaptive diagnostics system for facilitate performing the diagnostic task of the drilling rig control system at multiple wellsites. In one or more embodiments, the correlation result includes information regarding the failure and the corrective action. Accordingly, generating the correlation result includes (i) detecting, based on the health measure, a first occurrence of a failure within the component(s) of the drilling rig control system, (ii) identifying a corrective action that is activated by the expert user input in response to the first occurrence of the failure. Further, performing the diagnostic task of the drilling rig control system includes (i) detecting, based on the health measure, a second occurrence of the failure within the components of the drilling rig control system, (ii) retrieving, in response to the second occurrence of the failure and from the provided correlation result, the corrective action, and (iii) performing, by the adaptive diagnostics system, the retrieved corrective action.

An example of the adaptive diagnostics system facilitate performing the diagnostic task of the drilling rig control system is described in reference to FIGS. 6.1 and 6.2 below. As shown in FIGS. 6.1 and 6.2, the failure corresponds to a component of the drilling rig control system that becomes unavailable, where the corrective action performed by the expert user includes activating a backup path within the drilling rig control system in response to the failure. As used herein, the backup path is one or more components of the drilling control system that have capability to perform at least a portion of the functionality of the unavailable component of the failure. In one or more embodiments, generating the correlation result includes adjusting, in the knowledge graph, a measure of data communication associated with the backup path to generate an adjusted value, where the correlation result further includes the adjusted value associated with the backup path.

Figure 4:
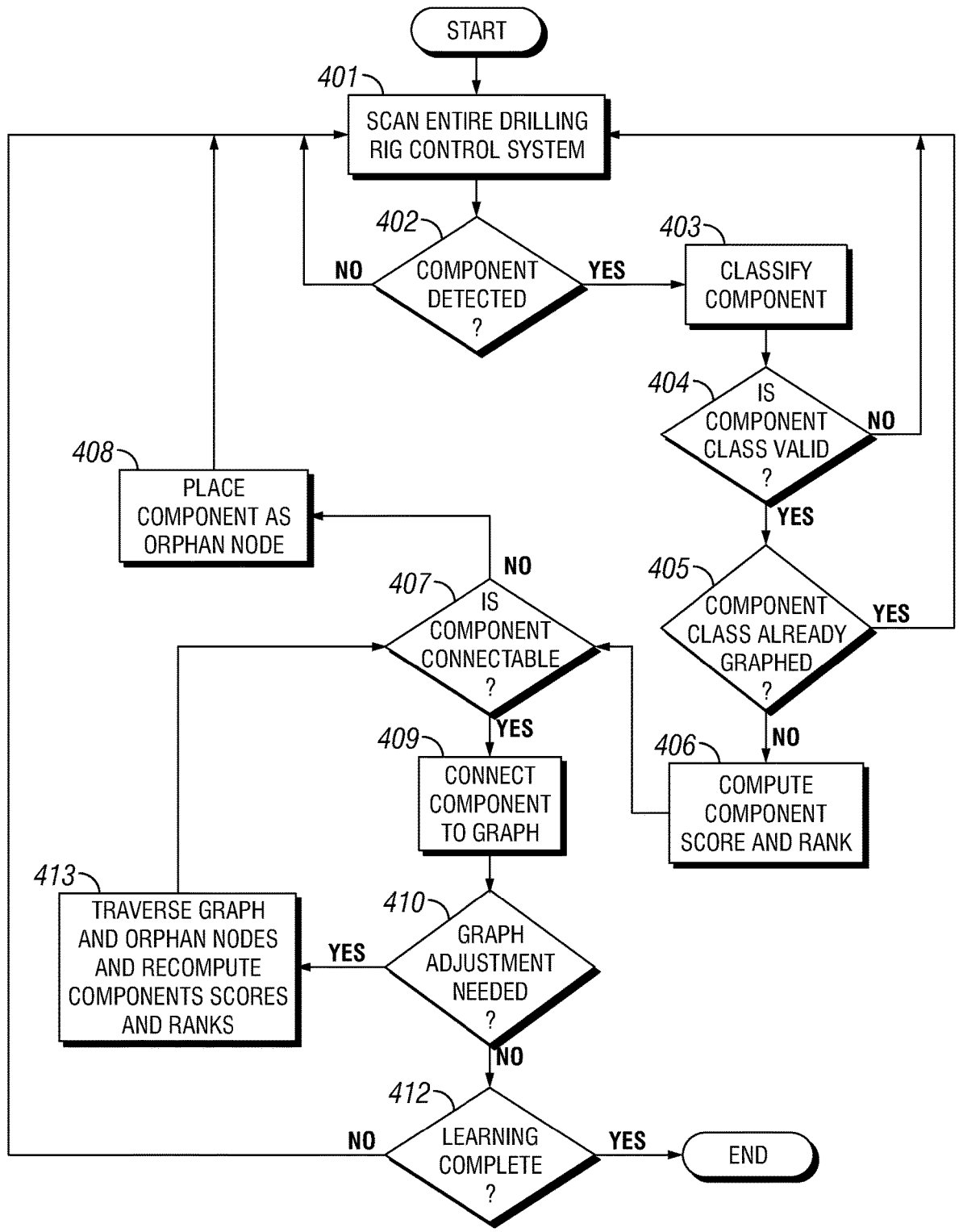

FIG. 4 shows a flowchart in accordance with one or more embodiments. In one or more embodiments, the method may be based on the systems depicted in FIGS. 1-2 above. One or more steps shown in FIG. 4 may be omitted, repeated, and/or performed in a different order among different embodiments of the invention. Accordingly, embodiments of the disclosure should not be considered limited to the specific number and arrangement of steps shown in FIG. 4.

In one or more embodiments, the flowchart depicted in FIG. 4 is used during a machine learning training phase to generate a knowledge graph of a drilling rig control system during a drilling operation. Each iteration through the flowchart is performed as individual sub-systems and hardware components are powered on and become online, i.e., start communicating via the network. The online components are detected through multiple iterations of the flowchart to generate and expand a knowledge graph of the drilling rig control system.

Initially in block 401, the drilling rig control system is scanned to detect any sub-system or hardware component that is online, i.e., communicating via the network. In one or more embodiments, the scanning is performed by the drilling rig commissioning system using network communication protocols. In one or more embodiments, the drilling rig commissioning system includes an artificial intelligence (AI) module that monitors all the processes running on the computers that are part of the drilling control system. When a new process (e.g., application, services, script, etc) starts running on any of the computer(s), the new process is detected by the AI module. Once a new process is detected, a dependency graph is generated as the knowledge graph. For example, as described in Blocks 402 through 412 below, the AI module may identify all the required software components such as DLL's, configuration files, database, network ports, network connections, etc, that are needed by the process. As multiple processes, or services, or scripts run on the computer(s), the AI module computes the importance of each software component by correlating to operational information. Operational information is provided during a learning stage when the system is taught how to detect different operational information. For drilling operations, most of the operational steps are pre-determined. Given that these operational steps repeat during the course of a drilling operation, the AI module may use the knowledge that a certain operation step is in progress and use numerical algorithms to determine or recalculate the importance of certain software components (or nodes). Because the time when the next operational step starts is not certain, stochastic methods of computing ranking may be applied. Depending on the upcoming operational step, ranking of nodes and edges change depending on the importance of each node and edge. In other words, rankings change depending on the importance of nodes and edges for certain steps of drilling operations. For example, during drilling, certain applications are required to be running and available in order to drill the well. The ranking for these applications are high before and during this operations step. There are also less important system components. In order to compute the ranking for these components, a statistical or probabilistic approach may be used.

In Block 402, a determination is made as to whether a sub-system or hardware component is detected. If the determination is negative, the method returns to Block 401 to continue scanning. If the determination is positive, the method proceeds to Block 403 where the detected component is classified, e.g., as one of many first hierarchy components and second hierarchy components of the drilling rig control system. In Block 404, a determination is made as to whether the detected component class is valid. If the determination is negative, the detected component is discarded and the method returns to Block 401 to continue scanning. If the determination is positive, the method proceeds to Block 405 where another determination is made as to whether the detected component is already included in the knowledge graph. If the determination is positive, the method returns to Block 401 to continue scanning. If the determination is negative, the method proceeds to Block 406 where a score and rank of the detected component is computed.

In one or more embodiments, the score represents a pre-determined measure of computing activities of the detected component. In one or more embodiments, the score represents a pre-determined measure of communication activities between the detected component and another component in the knowledge graph. Once the score is computed, the score is compared with other component scores in the knowledge graph to generate a rank of the newly detected component. Then the method proceeds to Block 407 where yet another determination is made as to whether the detected component is connectable into the knowledge graph. If the determination is negative, the method proceeds to Block 408 where the detected component is placed as an orphan node in the knowledge before the method returns to Block 401 to continue scanning. If the determination is positive, the method proceeds to Block 409 where the detected component is connected to other node(s) in the knowledge graph to expand the knowledge graph.

The method then proceeds to Block 410 where a determination is made as to whether graph adjustment is needed, e.g., if the newly detected component is able to connect to a previously detected orphan node. If the determination is positive, the method proceeds to Block 413 to traverse the knowledge graph and the orphan nodes. Subsequent Block 407 identifies one or more orphan nodes that become connectable due to the newly detected component. If the determination in Block 410 is negative, the method proceeds to Block 412 where the determination is made as to whether the machine learning training is complete. For example, the determination may be made using a machine learning algorithm. If the determination is negative, the method returns to Block 401 to enter the next iteration. If the determination is positive, the method ends and the knowledge graph is stored. In one or more embodiments, the stored knowledge is subsequently used by the drilling rig commissioning system for performing a management task of the drilling rig control system.

Figure 5:
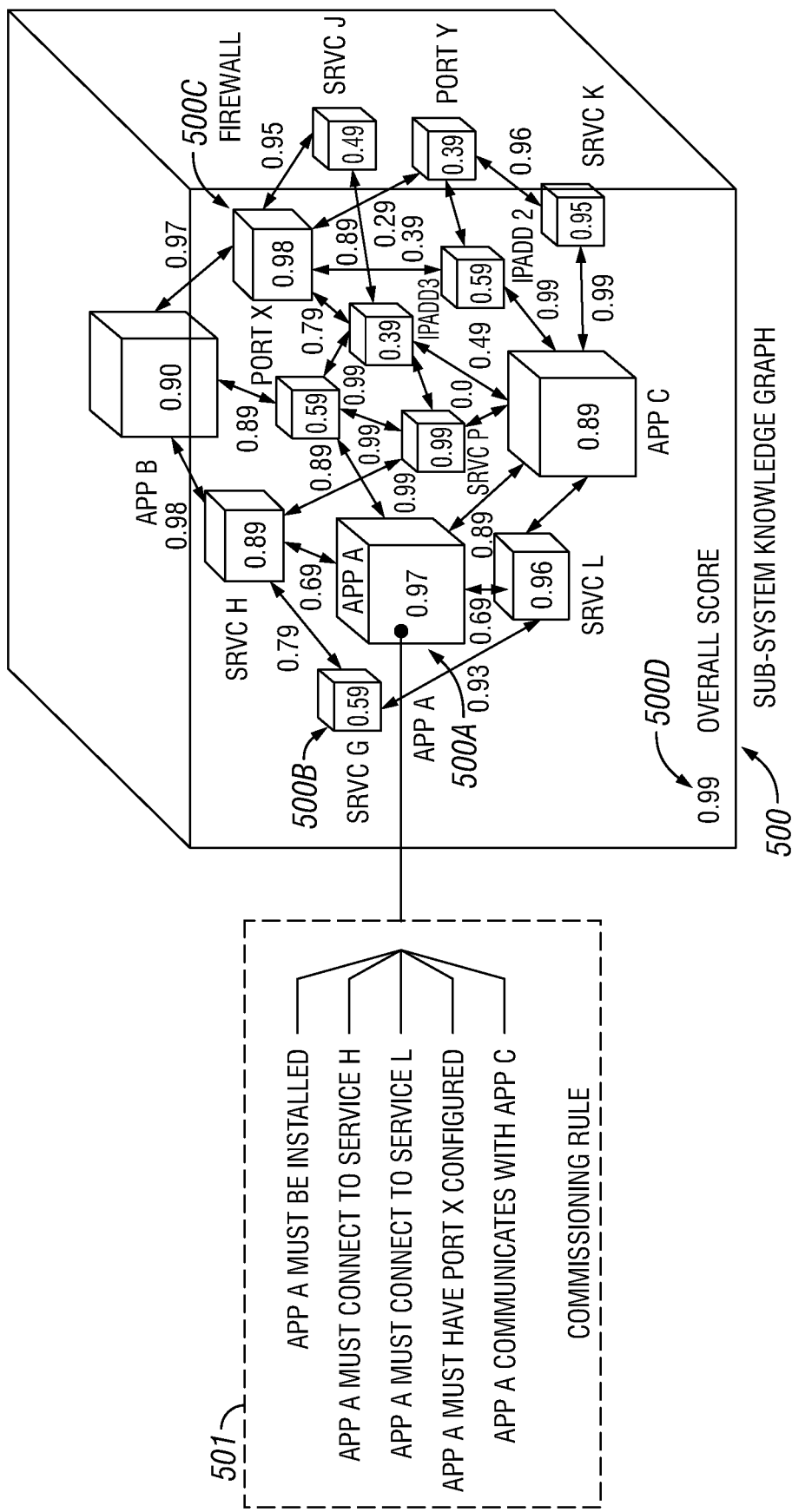

FIGS. 5-7 show examples in accordance with one or more embodiments. In one or more embodiments, the examples may be based on the systems depicted in FIGS. 1-2 above and/or the method flowcharts depicted in FIGS. 3-4 above. In one or more embodiments, one or more of the elements shown in FIGS. 5-7 may be omitted, repeated, and/or substituted. Accordingly, embodiments of the invention should not be considered limited to the specific arrangements of modules shown in FIGS. 5-7.

In the example depicted in FIGS. 5-7, multiple sub-systems exist to make up a drilling rig control system. There is the drilling control sub-system that operates machines to drill the well. There is the mud sub-system that mixes the drilling mud, which is pumped downhole by the pumping sub-system. There is the cementing sub-system that mixes and pumps cement. In addition to the above key drilling sub-systems, there are many other sub-systems such as the rig power generator system that co-exist and make up the overall drilling rig control system. Each of these sub-systems perform specialized functions by using heavy machinery and complex control systems to safely drill an oil and gas well. Often, there is minimal integration between these sub-systems mainly because these sub-systems are designed for standalone use. Different vendors may manufacture these sub-systems, and traditionally there has been very little collaboration to ensure smooth integration of these sub-systems. The level of integration between different sub-systems depend on how much collaboration exist between different sub-system vendors. When these sub-systems are used on a rig site, one or more rig commissioning engineers physically interconnect these sub-systems together to configure the entire drilling rig control system. Because of the vast number of rig sub-system types and configurations, rig commissioning engineers are required to have extensive knowledge and experience on many types of rig sub-systems to complete the rig commissioning tasks. The effort of integrating disparate rig sub-systems is often challenging, time consuming, and prone to errors.

As noted above, an intelligent drilling rig commissioning system is used to automatically commission drilling rig control systems. A drilling rig subsystem comes online when all mechanical connections, hardware installation, wiring, and any other physical connections are complete. As a sub-system comes online, the computing devices are powered on. At this stage, the intelligent drilling rig commissioning system takes over and performs all the software commissioning tasks necessary for the sub-system to perform all its functions. As part of the software commissioning tasks, the intelligent commissioning system performs software installation, license verification, user validation, network port configuration, and any other activities required for the sub-system control system to function properly. The intelligent commissioning system perform these actions based on the drilling rig sub-system knowledge graph. The sub-system knowledge graph contains all the information necessary for the intelligent system verify and validate the software installation and configuration at the sub-system level.

FIG. 5 shows an example sub-system knowledge graph (500) corresponding to the sub-system A (201a) depicted in FIG. 2.1 above. In the sub-system knowledge graph (500), nodes are denoted as cubes and links are denoted as double arrows. Each node and each link are assigned a score representing the pre-determined measure of computing activity and/or communication activity associated with the node/link. For example, AppA (500a) corresponds to an application software installed within the sub-system A (201a) and assigned the score 0.97, where nodes labeled AppB and AppC correspond to additional application software components that are assigned scores 0.90 and 0.89, respectively. These scores indicate that AppA (500a) has higher computing activity than AppB, which in turns has higher computing activity than AppC. In another example, SrvcG (500b) corresponds to a software service G of an operating system within the sub-system A (201a), where additional nodes labeled SrvcH, Srvc J, Srvc K, Srvc L, and Srvc P correspond to software services H, J, K, L, and P, respectively. In addition, firewall (500c) corresponds to the firewall software within the sub-system A (201a). Similarly, the nodes labeled PortX and PortY correspond to communication network ports within the sub-system A (201a). Further, the nodes labeled IPadd2 and IPadd3 correspond to network nodes with particular IP address 2 and IP address 3. Note that the links from AppA (500a) to SrvcH, SrvcL, and PortX are assigned the scores 0.69, 0.69, and 0.89, respectively. These scores indicates that AppA (500a) communicates with SrvcH and Srvc L with similar activity/frequency, which has a lower measure (i.e., less actively or less frequently) than the communication activity between AppA (500a) and PortX. The scores assigned to all nodes and links within the sub-system knowledge graph (500) are aggregated into an overall score (500d) that represents a pre-determined measure (i.e., 0.99) of aggregate internal computing/communication activities within the sub-system A (201a) during the drilling operation. For example, the overall score (500d) may be a weighted average of scores assigned to all nodes and links. In another example, the overall score (500d) may be computed, using other statistical formula, from the scores assigned to all nodes and links.

In an example scenario, the sub-system A (201a) is a self-contained computer, such as a notebook computer or a computer server that contain the aforementioned software applications, software services, firewall, communication network ports, network nodes, etc. The sub-system knowledge graph (500) also includes a commissioning rule (501) that specifies installation, connection, communication, and port configuration rules regarding the application software AppA (500a).

As the commissioning of each sub-system completes, the intelligent commissioning system automatically detects and performs further software configuration to ensure that all sub-systems communicate with each other within the drilling rig control system. The intelligent commissioning system also scans and performs compatibility tests with any of the equipment that are part of the drilling rig equipment and ensures that the software to control the equipment is available and properly configured. When a discrepancy is detected, the intelligent commissioning system connects to the cloud and downloads any missing software or software configuration artifacts necessary to fully install and properly configure the software for a given drilling rig control system installation. The intelligent commissioning system performs these actions based on the overall drilling rig control system knowledge graph. In one or more embodiments, the intelligent commissioning system also stores the type of the rig as part of the knowledge graph, such as a type and knowledge graph mapping database that may be used later on to commission same kind of new rigs.

FIG. 6.1 shows an example overall drilling rig control system knowledge graph (600) corresponding to the drilling rig control system (200) depicted in FIG. 2.1 above. FIG. 6.2 shows an example of the overall drilling rig control system knowledge graph (600) when a failure condition is detected. In the overall drilling rig control system knowledge graph (600), nodes are denoted as cubes and links are denoted as double arrows. Each node and each link are assigned a score representing the pre-determined measure of computing activity and/or communication activity associated with the node/link. For example, the node labeled Sub-systemX corresponds to the sub-system knowledge graph (500) depicted in FIG. 5 above, where nodes labeled Sub-systemY and Sub-systemZ correspond to additional sub-system knowledge graphs that are assigned overall scores 0.89 and 0.99, respectively. While the sub-system knowledge graph (500) corresponds to sub-system A (201a) depicted in FIG. 2.1 above, Sub-systemY and Sub-systemZ may correspond to other sub-systems depicted in FIG. 2.1 above. For example, Sub-systemY may correspond to sub-system B (201b). The scores of the Sub-systemX (i.e., 0.99) and Sub-systemY (i.e., 0.89) indicate that sub-system A (201a) has higher aggregate internal computing/communication activity than sub-system B (201b).

In another example, nodes labeled EquipX, EquipY, EquipZ, Tool1, Tool2, and Tool3 correspond to drilling equipment and other tools depicted in FIG. 1 above where each individually assigned score represents a usage statistics of the corresponding equipment/tool during the drilling operation. In addition, nodes labeled ConnectionA, ConnectionB, and ConnectionC correspond to network elements within the drilling rig control system. The nodes labeled AppAA and AppBB correspond to cloud based software applications accessible to various sub-system and hardware components within the drilling rig control system. Note that the links from Sub-systemX to EquipX, AppBB, and Tool3 are assigned the scores 0.09, 0.25, and 0.88, respectively. These scores indicates that Sub-systemX rarely communicates with EquipX, communicates relatively sparingly with AppBB, and communicates frequently with Tool3.

Without using the overall drilling rig control system knowledge graph (600), each sub-system of the drilling rig control system is commissioned individually by a team of experts who collaborates with other teams with different expertise to commission the entire drilling rig control system. The challenge lies in the enormous amount of information that few rig commissioning engineers master before they can perform all the software commissioning tasks effectively and efficiently. There is a race between rig commissioning engineers mastering the training material to perform their tasks and the ongoing evolution of each drilling rig sub-systems. Each drilling rig sub-systems continue to evolve as new techniques and technologies are introduced. As enhancements and new technologies are introduced, rig commissioning engineers undergo training. The amount of information that a rig commissioning engineer master has become challenging to teach in a reasonable amount of time. As a result, the knowledge gap continues to grow as new technologies are introduced by each drilling rig sub-systems. With the benefit of using the overall drilling rig control system knowledge graph (600) described above, a single team of engineers have enough expertise to fully commission the entire drilling rig control system without the presence of multiple teams of sub-system experts.

FIG. 7.1 shows an example of calculating ranking during a drilling rig operation sequence (420) that includes operations (421)-(426) and additional operations not explicitly shown. In particular, the same operation step ABC is performed at different time during the operation (421) and operation (424), the same operation step X is performed at different time during the operation (422) and operation (426), equipment maintenance is performed during the operation (425), and operation (423) represents downtime of the drilling operation. In the example shown in FIG. 4B, during each of the operations of the drilling rig operation sequence (420), AI algorithms are used to calculate a rank for elements in a knowledge graph, such as Node ABC, Equipment Maintenance application, and Operation X. As described above, the rank is calculated based on one or more of rig conditions, operational factors, operational stages, and overall system readiness. Specifically, as each operation is performed in the drilling rig operation sequence (420) shown in FIG. 4B, the rank of Node ABC varies as follows: 0.99999, 0.352, 0,8599, 0.90012, 0.0012, 0.00102, etc. As the ranks are performed throughout the drilling rig operation sequence (420), the drilling rig commissioning system continuously bringing the drilling rig to a working order, which may be performed any time prior to or during drilling operation, and may be performed once or periodically throughout the drilling operation.

The adaptive algorithms (e.g., adaptive diagnostics (251)) described above keeps track of all nodes and edges in the overall drilling rig control system knowledge graph (600) as operation progresses and adjusts scores and ranking. If a node or edge (e.g., connection A) becomes unavailable (e.g., a failure (601) may be detected), the algorithm (251) computes the best course of action by evaluating scores and rankings from nodes and edges. If there is a backup path (602) (e.g., connection B) that will correct the drilling rig control system (200), the algorithm (251) may produce a corrective action (or actions) for the rig technician (252) to take or the algorithm (251) may be configured to automatically correct the drilling rig control system (200). For example, as shown in FIG. 6.2, the connection B may be activated as the backup path (602) when the connection A is detected as unavailable (i.e., failure (601)). Accordingly, the six edges along with the scores 0.19, 0.78, 0.98, 0.99, 0.72, 0.35, and 0.89 are removed from the overall drilling rig control system knowledge graph (600), while the scores assigned to the remaining edges of the connection B may be adjusted from 0.29 and 0.59 to the adjusted scores 0.79 and 0.91, respectively. Corrective actions may also be directed to external systems or to the knowledge cloud (26), for example, as a mean to request for expert advice.

The computation that updates scores and ranks is adjusted by the machine learning process. As described above, when the system was trained by the expert rig technician, the adaptive algorithm adjusted the decision-making process to match that of the expert rig technician. Once the training process is complete, the algorithm uses the same decision methodology when is applicable. It also uses the expert rig technician decision methodology as reference if the situation is not the same. It is not mandatory to have the training step with the expert rig technician since the algorithm can be configured with predetermined scores and ranks provided by engineers who developed the sub-systems.

FIG. 7.2 shows an example of a dependency graph in accordance with one or more embodiments. The computation to update scores and ranks described above may be implemented in many ways. One possible way is to derive the scores and ranks based on a dependency graphs, such as the dependency graph (650) depicted in FIG. 7.2. An application usually depends on many external components. The level of dependency of an application to each external component may be used as a starting point for the scores and ranks for the knowledge graph.

In some embodiments, dependency graphs for an application cover only the libraries on which the application depends. In other embodiments, such as depicted in FIG. 7.2, the dependency graph (650) of an application (651) covers more than dependency of the application (651) with respect to software libraries (652). The dependency graph (650) also covers dependency of the application (651) with respect to additional elements (653), such as external services, port configuration, firewall configuration, files, libraries, use profiles, OS configuration, computer hardware settings, etc. The dependency graph (650) essentially maps everything that the application (651) needs to run and function properly including communication with external applications or systems.

In one or more embodiments, the application (651) corresponds to the AppA (500a) depicted in FIG. 5 above. The corresponding dependency graph (650), once constructed, is connected to other graphs in the sub-system knowledge graph (500) and the overall drilling rig control system graph (600) depicted in FIGS. 5 and 6.1 above to create an expanded version of the overall drilling rig control system graph (600). The expanded version of the overall drilling rig control system graph (600), including the dependency graph (650), thus contains all the information necessary for the adaptive diagnostics system (250) to perform diagnostics and maintenance activities that are usually performed by expert rig technicians.

As depicted in FIG. 2.1 above, each of the components that make up the expanded version of the overall drilling rig control system graph (600) may be classified as a network component, computer hardware component, programmable device, software application, software services, software library, file on disc etc. Depending on the classification each component, the adaptive algorithm uses different ways to determine the health status for each component. For example, the health status of a file on disk may be determined by its size on disk, accessibility, checksum of its content (if file is read-only), date of creation, file location, etc. The attributes that determines the health of a component can vary and they also impact the computation of scores and rankings.

Embodiments may be implemented on a computing system. Any combination of mobile, desktop, server, router, switch, embedded device, or other types of hardware may be used. For example, as shown in FIG. 8.1, the computing system (700) may include one or more computer processors (702), non-persistent storage (704) (e.g., volatile memory, such as random access memory (RAM), cache memory), persistent storage (706) (e.g., a hard disk, an optical drive such as a compact disk (CD) drive or digital versatile disk (DVD) drive, a flash memory, etc.), a communication interface (712) (e.g., Bluetooth interface, infrared interface, network interface, optical interface, etc.), and numerous other elements and functionalities.

The computer processor(s) (702) may be an integrated circuit for processing instructions. For example, the computer processor(s) may be one or more cores or micro-cores of a processor. The computing system (700) may also include one or more input devices (710), such as a touchscreen, keyboard, mouse, microphone, touchpad, electronic pen, or any other type of input device.

The communication interface (712) may include an integrated circuit for connecting the computing system (700) to a network (not shown) (e.g., a local area network (LAN), a wide area network (WAN) such as the Internet, mobile network, or any other type of network) and/or to another device, such as another computing device.

Further, the computing system (700) may include one or more output devices (708), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (702), non-persistent storage (704), and persistent storage (706). Many different types of computing systems exist, and the aforementioned input and output device(s) may take other forms.

Software instructions in the form of computer readable program code to perform embodiments of the disclosure may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the disclosure.

The computing system (700) in FIG. 8.1 may be connected to or be a part of a network. For example, as shown in FIG. 8.2, the network (720) may include multiple nodes (e.g., node X (722), node Y (724)). Each node may correspond to a computing system, such as the computing system shown in FIG. 8.1, or a group of nodes combined may correspond to the computing system shown in FIG. 8.1. By way of an example, embodiments of the disclosure may be implemented on a node of a distributed system that is connected to other nodes. By way of another example, embodiments of the disclosure may be implemented on a distributed computing system having multiple nodes, where each portion of the disclosure may be located on a different node within the distributed computing system. Further, one or more elements of the aforementioned computing system (700) may be located at a remote location and connected to the other elements over a network.

Although not shown in FIG. 8.2, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (722), node Y (724)) in the network (720) may be configured to provide services for a client device (726). For example, the nodes may be part of a cloud computing system. The nodes may include functionality to receive requests from the client device (726) and transmit responses to the client device (726). The client device (726) may be a computing system, such as the computing system shown in FIG. 8.1. Further, the client device (726) may include and/or perform all or a portion of one or more embodiments of the disclosure.

The computing system or group of computing systems described in FIGS. 8.1 and 8.2 may include functionality to perform a variety of operations disclosed herein. For example, the computing system(s) may perform communication between processes on the same or different systems. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until the server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, one authorized process may mount the shareable segment, other than the initializing process, at any given time.

Other techniques may be used to share data, such as the various data described in the present application, between processes without departing from the scope of the disclosure. The processes may be part of the same or different application and may execute on the same or different computing system.

Rather than or in addition to sharing data between processes, the computing system performing one or more embodiments of the disclosure may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the disclosure, may extract one or more data items from the obtained data. For example, the extraction may be performed as follows by the computing system (700) in FIG. 8.1. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail—such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 8.1, while performing one or more embodiments of the disclosure, may perform data comparison. Data comparison may be used to compare two or more data values (e.g., A, B). For example, one or more embodiments may determine whether A>B, A=B, A!=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the disclosure, A and B may be vectors, and comparing A with B includes comparing the first element of vector A with the first element of vector B, the second element of vector A with the second element of vector B, etc. In one or more embodiments, if A and B are strings, the binary values of the strings may be compared.

The computing system in FIG. 8.1 may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 8.1 may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system of FIG. 8.1 and the nodes and/or client device in FIG. 8.2. Other functions may be performed using one or more embodiments of the disclosure.

While the disclosure has been described with respect to a limited number of embodiments, those skilled in the art, having benefit of this disclosure, will appreciate that other embodiments can be devised which do not depart from the scope of the disclosure as disclosed herein. Accordingly, the scope of the disclosure should be limited only by the attached claims.

What is claimed is:

1. A method, comprising:
   detecting a first plurality of components of a drilling rig control system to control a drilling operation;
   obtaining a knowledge graph comprising
      a plurality of nodes corresponding to the first plurality of components; and
      a plurality of links connecting the plurality of nodes, wherein each of the plurality of links represents at least a target measure of data communication and resource utilization of each pair of components of the first plurality of components; and
   performing, by a drilling rig commissioning system and based on the knowledge graph, a management task of the drilling rig control system.

2. The method of claim 1,
   wherein the first plurality of components comprises a plurality of sub-systems and a plurality of hardware components,
   wherein the plurality of sub-systems and the plurality of hardware components collectively form a first hierarchy of the drilling rig control system,
   wherein a plurality sets of software components embedded in the plurality of sub-systems collectively form a second hierarchy of the drilling rig control system, and
   wherein each set of the plurality sets of software components is associated with an aspect of the drilling operation and installed on one of the plurality of sub-systems to control a portion of the plurality of the hardware components.

3. The method of claim 2,
wherein the knowledge graph comprises a overall drilling rig control system knowledge graph and a plurality of sub-system knowledge graph,
wherein the overall drilling rig control system knowledge graph corresponds to the first hierarchy, and
wherein the plurality of sub-system knowledge graph corresponds to the second hierarchy.

4. The method of claim 3, wherein performing the management task comprises:
performing, based on the knowledge graph, a software commissioning task of the second hierarchy of the drilling rig control system.

5. The method of claim 4, wherein the software commissioning task comprises at least one selected from a group consisting of software installation, software-to-service connection, software-to-software connection, license verification, user validation, and network port configuration of a sub-system software component in the second hierarchy of the second plurality of components.

6. The method of claim 3, wherein performing the management task further comprises:
establishing, based on the knowledge graph, a data communication connection between a pair of components comprised in the second hierarchy of the second plurality of components.

7. The method of claim 1, further comprising:
obtaining, during the drilling operation and from the plurality of components, a pre-determined measure of data communication and resource utilization of a pair of components of the plurality of components;
comparing, based on the knowledge graph, the pre-determined measure and a corresponding target measure of the pair of components to generate a result; and
performing a diagnostic task of the drilling rig control system based on the result.

8. The method of claim 1, further comprising:
obtaining, during the drilling operation and from the plurality of components, a health measure of the plurality of components;
comparing, based on the knowledge graph, the obtained health measure and a corresponding target measure of the plurality of components to generate a result; and
performing a diagnostic task of the drilling rig control system based on the result.

9. A drilling rig commissioning system, comprising:
a computer processor;
memory storing instructions, when executed by the computer processor, comprising functionality of:
detecting a first plurality of components of a drilling rig control system to control a drilling operation;
obtaining a knowledge graph comprising
a plurality of nodes corresponding to the first plurality of components; and
a plurality of links connecting the plurality of nodes, wherein each of the plurality of links represents at least a target measure of data communication and resource utilization of each pair of components of the first plurality of components; and
performing, based on the knowledge graph, a management task of the drilling rig control system; and
a data repository for storing the knowledge graph.

10. The drilling rig commissioning system of claim 9, wherein the first plurality of components comprises a plurality of sub-systems and a plurality of hardware components
wherein the plurality of sub-systems and the plurality of hardware components collectively form a first hierarchy of the drilling rig control system,
wherein a plurality sets of software components embedded in the plurality of sub-systems collectively form a second hierarchy of the drilling rig control system, and
wherein each set of the plurality sets of software components is associated with an aspect of the drilling operation and installed on one of the plurality of sub-systems to control a portion of the plurality of the hardware components.

11. The drilling rig commissioning system of claim 10,
wherein the knowledge graph comprises a overall drilling rig control system knowledge graph and a plurality of sub-system knowledge graph,
wherein the overall drilling rig control system knowledge graph corresponds to the first hierarchy, and
wherein the plurality of sub-system knowledge graph corresponds to the second hierarchy.

12. The drilling rig commissioning system of claim 11, wherein performing the management task comprises:
performing, based on the knowledge graph, a software commissioning task of the second hierarchy of the drilling rig control system.

13. The drilling rig commissioning system of claim 12, wherein the software commissioning task comprises at least one selected from a group consisting of software installation, software-to-service connection, software-to-software connection, license verification, user validation, and network port configuration of a sub-system software component in the second hierarchy of the second plurality of components.

14. The drilling rig commissioning system of claim 11, wherein performing the management task comprises:
establishing, based on the knowledge graph, a data communication connection between a pair of components comprised in the second hierarchy of the second plurality of components.

15. The drilling rig commissioning system of claim 9, wherein performing the management task comprises:
obtaining, during the drilling operation from the plurality of components, a pre-determined measure of data communication and resource utilization of a pair of components of the plurality of components;
comparing, based on the knowledge graph, the pre-determined measure and a corresponding target measure of the pair of components to generate a result; and
performing a diagnostic task of the drilling rig control system based on the result.

16. A non-transitory computer readable medium storing instructions, the instructions when executed comprising functionality for:
detecting a first plurality of components of a drilling rig control system to control a drilling operation;
obtaining a knowledge graph comprising
a plurality of nodes corresponding to the first plurality of components; and
a plurality of links connecting the plurality of nodes, wherein each of the plurality of links represents at least a target measure of data communication and resource utilization of each pair of components of the first plurality of components; and
performing, based on the knowledge graph, a management task of the drilling rig control system.

17. The non-transitory computer readable medium of claim 16,
wherein the first plurality of components comprises a plurality of sub-systems and a plurality of hardware components,
wherein the plurality of sub-systems and the plurality of hardware components collectively form a first hierarchy of the drilling rig control system,
wherein a plurality of software components embedded in the plurality of sub-systems collectively form a second hierarchy of the drilling rig control system,
wherein each set of the plurality sets of software components is associated with an aspect of the drilling operation and installed on one of the plurality of sub-systems to control a portion of the plurality of the hardware components,
wherein the knowledge graph comprises a overall drilling rig control system knowledge graph and a plurality of sub-system knowledge graph,
wherein the overall drilling rig control system knowledge graph corresponds to the first hierarchy, and
wherein the plurality of sub-system knowledge graph corresponds to the second hierarchy.

18. The non-transitory computer readable medium of claim 17, wherein performing the management task comprises:
performing, based on the knowledge graph, a software commissioning task of the second hierarchy of the drilling rig control system.

19. The non-transitory computer readable medium of claim 18, wherein performing the management task further comprises:
establishing, based on the knowledge graph, a data communication connection between a pair of components comprised in the second hierarchy of the second plurality of components.

20. The non-transitory computer readable medium of claim 16, wherein performing the management task comprises:
obtaining, during the drilling operation and from the plurality of components, a pre-determined measure of data communication and resource utilization of a pair of components of the plurality of components;
comparing, based on the knowledge graph, the pre-determined measure and a corresponding target measure of the pair of components to generate a result;
and performing a diagnostic task of the drilling rig control system based on the result.

21. The non-transitory computer readable medium of claim 16, wherein performing the management task comprises:
obtaining, during the drilling operation and from the plurality of components, a health measure of the plurality of components;
comparing, based on the knowledge graph, the obtained health measure and a corresponding target measure of the plurality of components to generate a result; and
performing a diagnostic task of the drilling rig control system based on the result.

22. A method, comprising:
detecting a plurality of components of a drilling rig control system to control a drilling operation;
obtaining, during a machine learning training phase of the drilling operation at the wellsite and from the plurality of components, a pre-determined measure of data communication and resource utilization of each pair of components of the plurality of components;
generating, using a machine learning algorithm, a knowledge graph comprising
a plurality of nodes corresponding to the plurality of components; and
a plurality of links connecting the plurality of nodes,
wherein each of the plurality of links represents the pre-determined measure of data communication between a corresponding pair of components; and
providing the knowledge graph to a drilling rig commissioning system or adaptive diagnostics system for performing a management or diagnostic task of the drilling rig control system.

23. The method of claim 22, further comprising:
obtaining, during the drilling operation and from the plurality of components, a health measure of the plurality of components;
monitoring, during the machine learning training phase, an expert user input that is used for diagnostics and maintenance of the first wellsite;
comparing, during the machine learning training phase, the health measure and the expert user input to generate a correlation result; and
providing the correlation result to the adaptive diagnostics system for performing the diagnostic task of the drilling rig control system.

24. The method of claim 23, further comprising:
storing the correlation result in the knowledge graph,
wherein the correlation result is provided via the knowledge graph to the adaptive diagnostics system.

25. The method of claim 23, further comprising:
storing the correlation result in a knowledge cloud; and
wherein the correlation result is provided via the knowledge cloud to the adaptive diagnostics system for performing the diagnostic task of the drilling rig control system.

26. The method of claim 23, generating the correlation result comprising:
detecting, based on the health measure, a first occurrence of a failure within the plurality of components; and
identifying a corrective action that is activated by the expert user input in response to the first occurrence of the failure,
wherein the correlation result comprises the failure and the corrective action.

27. The method of claim 23, performing the diagnostic task of the drilling rig control system comprising:
detecting, based on the health measure, a second occurrence of the failure within the plurality of components;
retrieving, in response to the second occurrence of the failure and from the provided correlation result, the corrective action; and
performing, by the adaptive diagnostics system, the retrieved corrective action.

28. The method of claim 26,
wherein the failure corresponds to a component of the plurality of components that becomes unavailable,
wherein the corrective action comprises a backup path within the plurality of components that is activated by the expert user input in response to the failure,
wherein generating the correlation result further comprises adjusting the pre-determined measure of data communication associated with the backup path to generate an adjusted value of the pre-determined measure in the knowledge graph, and
wherein the correlation result further comprises the adjusted value of the pre-determined measure.

29. A method, comprising:
- detecting a first plurality of components of a drilling rig control system to control a drilling operation;
- obtaining a knowledge graph comprising
  - a plurality of nodes corresponding to the first plurality of components; and
  - a plurality of links connecting the plurality of nodes,
  - wherein each of the plurality of links represents at least a target measure of data communication and resource utilization of each pair of components of the first plurality of components;
- obtaining, during the drilling operation at the first wellsite and from the plurality of components, a health measure of the plurality of components;
- comparing, based on the knowledge graph, the obtained health measure and a corresponding target measure of the plurality of components to generate a result; and
- performing, at the first wellsite, a diagnostic task of the drilling rig control system based on the result.

* * * * *